B. Griffin,
Bed Bottom,
N°. 67,647.  Patented Aug. 13, 1867.
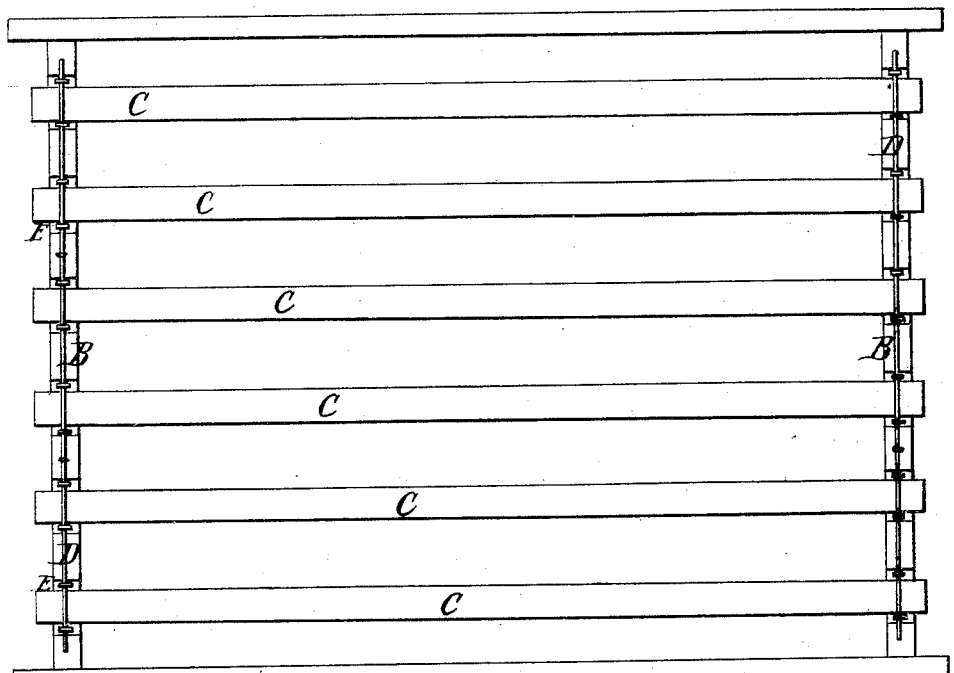
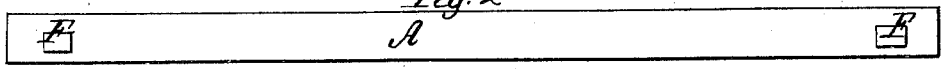
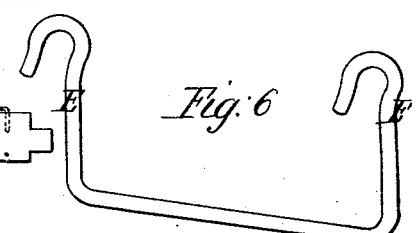
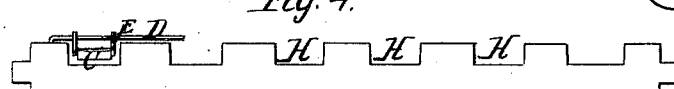
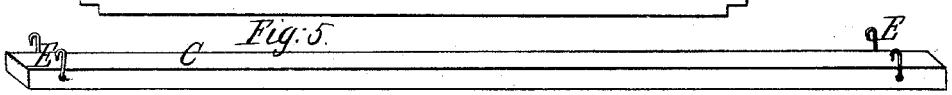
Witnesses;
James H. Barker
A. P. Swan
Inventor;
Benjamin Griffin

United States Patent Office.

BENJAMIN GRIFFIN, OF LAWRENCE, MASSACHUSETTS.

Letters Patent No. 67,647, dated August 13, 1867.

IMPROVED BED-BOTTOM.

The Schedule referred to in these Letters Patent and making part of the same.

TO ALL WHOM IT MAY CONCERN:

Be it known that I, BENJAMIN GRIFFIN, of Lawrence, in the county of Essex, and State of Massachusetts, have invented a new and useful improvement in Bed-Bottoms; and I do hereby declare that the following is a full and exact description thereof, reference being had to the accompanying drawings and to the letters of reference marked thereon.

To enable others skilled in the art to make and use my invention, I will proceed to describe its construction and operation.

Figure 1 represents an upper or top view.
Figure 2 represents a side piece or rail.
Figure 3 represents head and foot bars.
Figure 4 represents end view and connection of the slat to the concaved bar.
Figure 5 represents the slats with wire hooks in.
Figure 6 represent full-size wire hooks.
Figure 7 represents full-size staple.

Letter A represents side piece or rail, or part of frame. B represents the head and foot bars. C represents the slat with the wire hooks connected. D represents the wire that goes across the openings in said bar to hang the slats on. E represents wire hooks, as made in the slat, as shown in fig. 5. F represents mortise in side rail to receive the tenon on the bars which make the frame. G represents tenon on said bars. H represents the place to put the slat in said bars. I represents the full-size staple. When the slats are hung in the frame they give an easy vibration to and fro of the slat, and when the pressure is on it shortens them and allows the swinging in a little of the wire hooks E, which enables the slat G to spring down and return without making any squeaking noise. I make the slat G two and a half inches wide, nine-sixteenths thick, and bore the holes near the end. I then put in a straight piece of wire and bend it into hooks, as shown in letter E. I make the bars B out of two by three stuff, and cut out to receive free play for the slat G. I then take a straight piece of wire, D, bend it down at each end about one inch, and make the holes in the bar B near each end, and drive in the wire ends, as shown in fig. 3, and then fasten with wire staples, as seen in fig. 1. I make the side rail A six feet long, three-fourths to one-sixteenth thick, and mortised near each end to receive said bars. When I put the slats in I run both ends under the cross-wire D; then I hook on one end at a time, and the slat can be turned over and hooked on one side as well as the other, in case they should get bent a little by using. In having the slat so thin, and hung in this way, it gives a great elasticity to the slat and makes a very strong, durable, and economical and cheap spring-bed bottom.

What I claim as my invention, and desire to secure by Letters Patent, is—

I claim the cross-wire D, when connected with the concaved bar, for the purpose set forth, and the swinging hooks, when combined with the slat for the purpose specified.

BENJAMIN GRIFFIN. [L. S.]

Witnesses:
JAMES K. BARKER,
A. G. SWAN.